Dec. 1, 1964 S. R. ROSENTHAL 3,158,935
DENTAL MIRROR
Filed Sept. 11, 1961 2 Sheets-Sheet 1
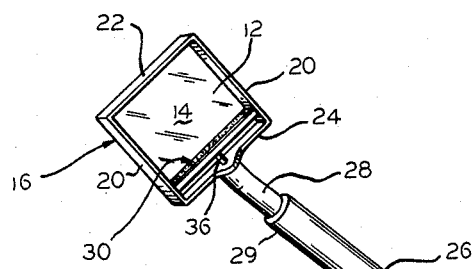
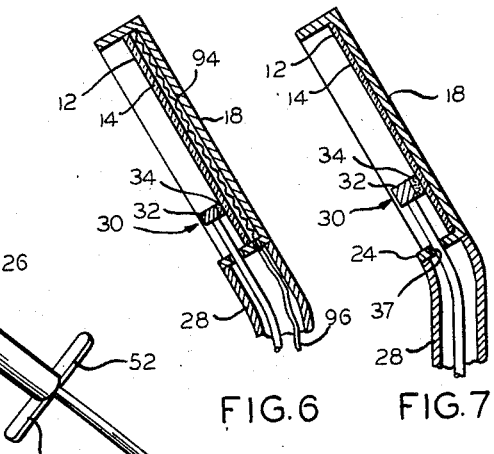
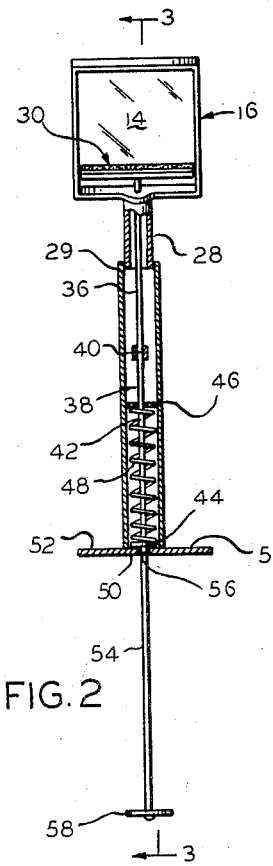
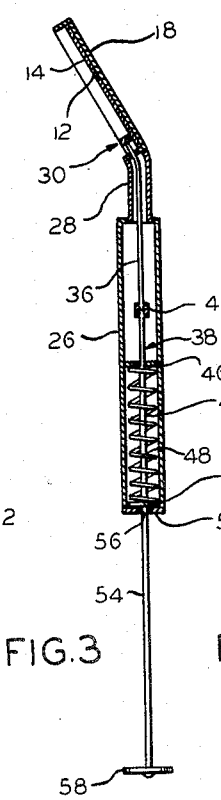
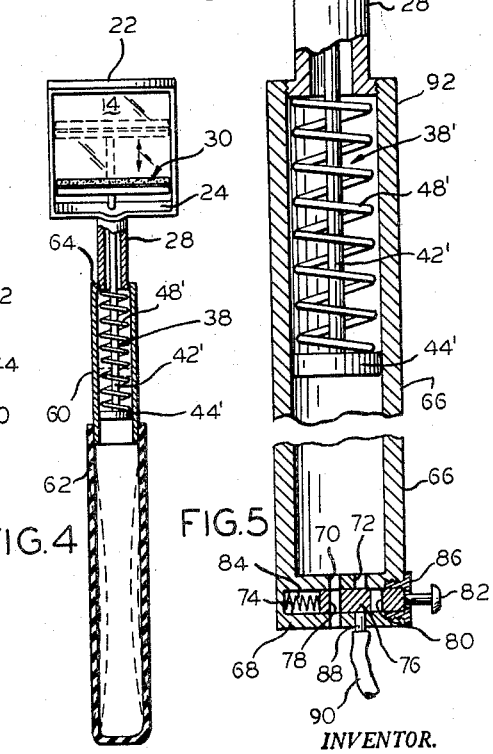
*INVENTOR.*
SOL ROY ROSENTHAL
BY
ATTORNEYS

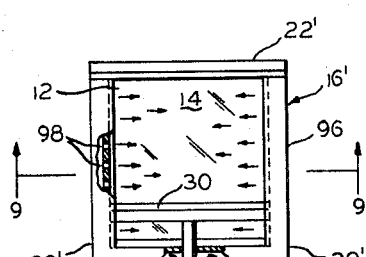

United States Patent Office 3,158,935
Patented Dec. 1, 1964

3,158,935
DENTAL MIRROR
Sol Roy Rosenthal, 230 E. Delaware Place, Chicago, Ill.
Filed Sept. 11, 1961, Ser. No. 137,255
13 Claims. (Cl. 32—69)

This invention relates to a dental mirror instrument having means for removing water from the face of the mirror while the instrument is in use.

The conventional dental mirror instrument is constructed of a normally glass mirror element which is reflectively coated on the back surface to provide a mirror having a reflecting face. The mirror is enclosed in a frame and the frame is mounted on an elongated handle. A relatively narrow neck may be interposed between the handle and the frame and the neck may be bent at an obtuse angle for convenience in use.

The dentist grasps the handle of the instrument by the fingers of one hand and inserts the mirror into the patient's mouth, while manipulating another instrument with the other hand. It frequently happens that water impinges or water vapor condenses on the face of the mirror and obstructs the view, so that the mirror must be dried. The problem is more acute when a water spray or stream is injected into the patient's mouth, as occurs in using the modern air driven water cooled drills. When the dentist must stop to dry the mirror, it interferes with and prolongs the treatment.

An important object of the present invention is to provide a dental mirror instrument which is constructed for removing water from the face of the mirror while the instrument is in use within the patient's mouth.

A particular object is to provide an instrument which includes structure for wiping the face of the mirror while in use.

Another particular object is to provide an instrument which includes means for vaporizing water from the face of the mirror while in use.

An additional object is to provide a structure in which operating elements for the water removing means are carried by the handle of the instrument.

Another object is to provide a dental mirror instrument bearing illumination means, and particularly, which cooperate with the water removing means.

Further objects include the provisions of a relatively simple, economical and adaptable structure of the kind referred to above which is convenient, efficient and reliable in use.

These and other objects, advantages and functions of the invention will be apparent on reference to the specification and to the attached drawings illustrating certain preferred embodiments of the invention, in which like parts are identified by like reference symbols in each of the views, and in which:

FIGURE 1 is a perspective view of one embodiment of the new dental mirror instrument;

FIG. 2 is a front elevational and longitudinal sectional view thereof;

FIG. 3 is a side elevational and longitudinal sectional view thereof;

FIG. 4 is a front elevational and longitudinal sectional view of a second embodiment of the instrument;

FIG. 5 is an enlarged broken longitudinal sectional view of the handle and associated structure of a third embodiment;

FIG. 6 is an enlarged longitudinal sectional view of the mirror and associated structure in a fourth embodiment;

FIG. 7 is a view like FIG. 6 of the embodiment of FIG. 1;

FIG. 8 is an enlarged front elevational and longitudinal sectional view of a fifth embodiment, wherein parts are shown in exaggerated proportions for clear illustration;

FIG. 9 is an enlarged cross-sectional view taken on line 9—9 of FIG. 8;

FIG. 10 is an enlarged front elevational view with parts broken away of the mirror and associated structure in a sixth embodiment which includes illuminating means; and FIG. 11 is an enlarged cross-sectional view taken on line 11 of FIG. 10.

In a preferred embodiment, the new dental mirror instrument of the invention includes a mirror insertable in the mouth of a patient, a wiper mounted for movement on the face of the mirror, a handle connected to the mirror, and means carried by the handle for moving the wiper on the mirror. In another preferred embodiment, means are provided adjacent to the mirror for vaporizing water from the face of the mirror. The wiper and the vaporizing means may be employed together, or either may be employed alone.

Referring particularly to FIGS. 1–3 and 7 of the drawings, the dental mirror instrument is generally indicated by the reference numeral 10. It includes a conventional glass mirror 12 having a reflecting face 14. The mirror is mounted in a frame 16, having a back wall 18, a pair of like parallel longitudinal side walls 20, an outer end wall 22, and an inner end wall 24. In this embodiment, the mirror 12 is secured in a conventional manner to the back wall 18 of the frame, such as by an adhesive. The mirror is enclosed by the end and side walls, and the walls project outwardly therefrom.

The mirror frame 16 is mounted on a tubular handle 26. A tubular neck 28 is interposed between the handle and the frame, being connected at opposite ends thereof to the inner frame wall 24 and the inner end 29 of the handle, respectively. As in the conventional instruments, the neck 28 is bent at an obtuse angle for convenience in using the instruments. It is in threaded engagement with the handle end 29.

In each of the illustrative embodiments, an elongated wiper or squeegee 30 is transversely mounted on the face 14 of the mirror for reciprocal movement thereon between the end walls 22 and 24 of the frame.

The wiper is normal to the side walls 20 and is guided by the walls during its movement therealong. The wiper includes an outer rigid blade holder 32 (FIGS. 6 and 7) and an inner flexible blade 34 which contacts the face 14 of the mirror. The blade holder may be constructed of metal or other suitable rigid material, and the blade may be constructed of elastomeric material or other material which will contact the mirror face intimately to wipe it clean. As the wiper is moved back and forth on the face of the mirror, it removes water present on the surface, which may be in the form of droplets, a film, or water vapor condensate.

The blade holder 32 is connected to an operating arm or coupling member 36, which in the preferred embodiment is a flexible wire or cable. This flexible coupling extends through an opening 37 (FIG. 7) provided in the inner end wall 24 of the frame, and through the neck 28 into the handle 26. There, it is secured to a plunger 38 (FIGS. 2 and 3) by a threaded sleeve 40. The mirror frame 16 and mirror 14, the wiper 30, the neck 28, and the coupling 36 are removable at the said threaded connections for separate sterilization.

The plunger 38 includes a rigid rod 42 connected to the flexible coupling 36 by the sleeve 40, and a transverse head 44 joined to the rod at the opposite end thereof. In the embodiment of FIGS. 1–3, a washer 46 is fixed transversely within the handle 26, intermediate the ends of the handle, and the plunger rod 42 reciprocates longitudinally through a corresponding central opening in the washer. A coil compression spring 48 surrounds the plunger rod and is inserted between the washer 46 and the plunger head 44. The force of the spring causes the plunger head to seat on the outer end 50 of the handle in the initial or starting position of the plunger.

A pair of finger grips 52 are integral with the handle end 50 and extend outwardly in opposite directions therefrom. A rigid actuating or push rod 54 extends longitudinally through a central opening 56 in the handle end 50. This rod and the plunger rod may be formed in one piece. A transverse thumb disc 58 is secured on the outer end of the actuating rod 54.

The embodiment of FIGS. 1-3 is operated by holding one or both of the finger grips 52 in the hand and pressing the thumb disc 58 by the thumb or another finger, as most convenient. The wiper 30 travels from its initial position adjacent the inner end wall 24 to a position adjacent the outer end wall 22 of the frame and wipes the mirror face 14 clean. Upon releasing the thumb disc 58, the resilient means including the spring 48 restores the plunger 38 to its initial position, thereby restoring the wiper blade to its initial position and wiping the mirror face 14 a second time. In this manner, the mirror may be wiped as frequently as desired and without detracting from the treatment which is in progress.

FIGS. 4 and 5 illustrate additional embodiments of the structure for moving the wiper on the mirror. The structures include pneumatic piston and cylinder moving means. In each case, a plunger 38' is employed which constitutes a piston reciprocally mounted in a cylinder. The plunger head 44' constitutes the piston head, and the head is slidably movable on the inner wall of the cylinder therearound.

In the embodiment of FIG. 4, a cylinder 60 corresponds to the inner section of the handle 26 of the preceding embodiment. The cylinder is open at its outer end, and a flexible resilient compression or squeeze bulb 62 is secured to the open end therearound. In this embodiment, and in the embodiment of FIG. 5, the plunger rod 42' is a flexible cable which is joined directly to the wiper 30. A coil spring 48' is mounted on the rod between the plunger head 44' and the inner end 64 of the cylinder. When the bulb 62 is compressed by the hand, the plunger 38' moves against the spring to move the wiper towards the outer end wall 22 of the frame, as illustrated by the broken line showing. When the pressure on the bulb is released, the spring action causes the plunger and the wiper to return to their initial positions, illustrated in full lines.

In the embodiment of FIG. 5, a cylinder 66 is provided with means for connection to a source of compressed air (not shown). The outer end of the cylinder is closed by a solid section 68. Tow longitudinal openings 70 and 72 extend through the end section. A transverse bore 74 is formed in the end section, and it intersects the longitudinal openings 70 and 72. A slide valve 76 is mounted in the core, and it is provided with spaced apart openings 78 and 80 therethrough which are adapted to register alternately with the respective longitudinal cylinder openings 70 and 72. The valve is operated by an outwardly extending control button 82 connected thereto. A coil compression valve spring 84 is mounted in the transverse cylinder bore 74 at the opposite end of the valve, to urge the valve to a normally outer position. The valve is retained within the bore by a collar plug 86 in threaded engagement with the cylinder end section 68. A nipple 88 is secured in one longitudinal cylinder opening 72 and extends outwardly from the cylinder end. A flexible conduit 90 is secured on the nipple, and it is joined at its other end to a source of compressed air, not shown. The dentist's equipment ordinarily includes a source of compressed air which may be connected to the conduit 90 conveniently.

The cylinder 66 in the embodiment of FIG. 5 normally is vented to the atmosphere in the manner illustrated, with the second longitudinal cylinder end opening 70 registering with the inner valve opening 78. When it is desired to operate the wiper 30, the button 82 is depressed. The inner valve opening 78 moves out of register with the second end opening 70, and the outer valve opening 80 registers with the first end opening 72. The interior of the cylinder 66 then communicates with the source of compressed air through the registering openings 72 and 80, and the nipple 88.

Compressed air is admitted to the cylinder 66 through the conduit 90, causing the plunger 38' to move in the direction of the inner end 92 of the cylinder. The corresponding movement of the plunger rod 42' causes the wiper 30 to move in like manner to the embodiment of FIG. 4. When the control button 82 is released, the valve 76 is returned to its initial position by the valve spring 84 to shut off the supply of compressed air and vent the cylinder through the second end opening 70 and registering inner valve opening 78. With the pressure released in this manner, the plunger and the wiper blade return to their initial positions.

It will be apparent that the wiper 30 may be mounted in other ways for removing water from the surface of the mirror 12, and the wiper may take other forms. The structure for moving the wiper may be constructed and arranged in other ways, and other mechanical, electrical and magnetic means may be employed in equivalent ways to accomplish like results. For example, the wiper may be actuated by a spring mechanism which is wound periodically to provide the energy for operating the wiper a number of times. In another alternative, the plunger 38' may be operated automatically by connecting the cylinder 66 to conventional mechanism for alternately supplying compressed air to the cylinder and exhausting the cylinder.

In the embodiment of the invention illustrated in FIG. 6, additional means are provided adjacent to the mirror for vaporizing water from the face of the mirror. Such means are advantageous for dispelling condensate or eliminating "fogging" on the mirror face 14. The water vaporizing means may be employed alone to advantage, especially when water sprays or streams are not directed into the patient's mouth. Alternatively, as shown in the illustrative embodiment, the vaporizing means may be provided with the wiping means to assist the latter in clearing the face of the mirror. Also, with this construction, either means may be used independently of the other as the situation requires.

The illustrative water vaporizing means includes an electrical resistance heating element 94 mounted behind the mirror 12 for heating the mirror and vaporizing the water from the face 14 of the mirror. Alternatively, the heating element may be embedded in the mirror or arranged in other suitable ways. Electrical conductors 96 are connected to the heating element, and they extend through the neck 28 and into the handle 26 of the instrument. The conductors may be joined adjacent to the outer end of the handle, which remains away from the patient's body, to an electrical cord leading to a source of electrical current. If desired, an electrical switch (not shown) may be mounted on the handle 26 for controlling the supply of current to the heating element 94.

The resistance heating means may be constructed and arranged in other ways, and other vaporizing means may be employed to obtain like results. Thus, for example, an air current, preferably warm air, may be directed on the face 14 of the mirror to vaporize water therefrom. In providing such means, one or more orifices are arranged adjacent the mirror face, and means for conducting a stream of air thereto are carried by the handle 26. The handle may represent a modification of the structures illustrated in FIG. 4 and FIG. 5, whereby air is conducted onto the mirror face 14 by like means.

An example of such construction is illustrated in FIGS. 8 and 9. Air is discharged over the face 14 of the mirror 12 from a frame 16' including a forked manifold 96. The manifold includes channeled sides 20' having a plurality of orifices 98 in the inner walls thereof. The sides 20' also include inwardly projecting retaining flanges 100, for holding the wiper 30 on the mirror surface. Such retaining means likewise may be incorporated in the preceding embodiments if there is a tendency for the wiper to lift off of the mirror surface.

A tubular handle 102 on the embodiment of FIG. 8 is threadedly secured on the rack 28, which is in turn connected to the manifold 96 in internal communication therewith. The outer end of the handle is closed by a solid section 104 having a transverse bore 106. A longitudinal end opening 108 extends from the interior of the solid section 104 adjacent the side wall of the handle to the bore 106, for supplying air to the interior of the handle 102. A tubular cylinder 110 is coaxially mounted within the handle 102 and spaced therefrom, so that the end opening 108 communicates with an annular chamber 112 defined by the walls of the respective tubular posts. A second longitudinal end opening 114 extends from the interior of the solid section 104 at a location within the cylinder 110, to the bore 106. The second opening is arranged for supplying air to operate a piston 38' in the cylinder 110 to move the wiper 30, in the manner of preceding embodiments. The piston moves against the coil spring 48' located between the plunger head 44' and a washer 116 fixed in the cylinder for movement of the plunger rod 42' therethrough. A plurality of openings 117 are formed in the cylinder 110 beyond the washer 116, establishing communication between the chamber 112 and the interior of the neck 28, around the rod 42'.

The instrument of FIG. 8 may be operated to drive the wiper 30, supply air through the manifold 96, or both. A slide valve 118 is reciprocally movable in the bore 106, against a captive coil spring 120. The valve is operated by a button 121 and is retained in the bore by a collar plug 122. The valve is constructed for establishing selective communication between the respective chamber and cylinder end openings 108 and 114, and an air conduit 90 connected to a nipple 88 in an outer opening to the bore 106, as also provided in FIG. 5. The valve is constructed for venting the cylinder 110 by establishing communication between the cylinder end opening 114 and a vent opening 124.

In the illustrated normal first position of the valve 118, a flow opening 126 therethrough establishes communication between the cylinder end opening 114 and the vent opening 124, establishing condition 1: cylinder 110 vented, no air supply to instrument. By moving the valve 118 to the right into its second position, or depressing the button 121, the vent opening 124 is closed, and the cylinder end opening 114, the flow opening 126, and the air conduit 90 are in communication, establishing conditions 2: air supply to piston 38' and cylinder 110 only, wiper 30 moved outwardly. By moving the valve 118 to the right into its third position, both the cylinder and opening 114 and the chamber opening 108 communicate with the conduit 90 through the flow opening 126, establishing condition 3: air supply to piston 38' and cylinder 110 and to chamber 112, wiper 30 moved outwardly and air delivered to manifold 96 and discharged from orifices 98. By moving the valve 118 to the right into its fourth position, only the chamber opening 108 communicates with the conduit 90 through the flow opening 126. A discharge opening 128 through the valve registers with the cylinder end opening 114 and the vent opening 124, establishing condition 4: air supply to chamber 112 only and cylinder 110 vented, air delivered to manifold 96 and wiper 30 returned inwardly. The wiper may be reciprocated by moving the valve 118 between positions 1 and 2, or between positions 3 and 4, with accompanying air delivery to the mirror face 14 in the latter positions. When not in use, the mirror, neck, piston and cylinder, and associated structure may be removed for separate sterilization by unscrewing the neck 28 from the handle 102.

FIGS. 10 and 11 illustrate the provision of illuminating means in the new instrument. Two lamps 130 are mounted along the respective frame side walls 20''. They may be, for example, incandescent lamps as shown, or neon lamps, which are energized by a battery (not shown) mounted in the handle of the instrument or by conductors leading from the instrument handle to a source of current. The lamps are mounted on a holder 132 which constitutes the inner frame wall, and they are connected within the holder to electrical conductors 134 which enter through the neck 28. The lamps are constructed as retaining members for the wiper 30. They are inverted L-shaped and extend inwardly, retaining the wiper between them during its reciprocal movement in like manner to the flanges 100 of the embodiment of FIGS. 8 and 9. The outer frame walls 22' and 22'' of the respective structures of FIGS. 8 and 10 are removable for removing the wiper, and in the latter case, for replacing the lamps. In an alternative embodiment, illumination may be furnished by a heating element such as shown at 94 in FIG. 6, which also glows, and the element may be embedded in the mirror 12.

The invention thus provides a new and improved dental mirror instrument which serves to maintain the face of the mirror free of obscuring water droplets, film or condensate while the dental treatment is in progress. Co-operating illuminating means are provided in an advantageous embodiment. The instrument remains relatively simple, economical, convenient and adaptable to the normal dental office equipment.

While several preferred embodiments of the invention have been described and illustrated, it will be apparent that various changes and modifications may be made with the spirit and scope of the invention. It is intended that such changes and modifications be included within the scope of the appended claims.

I claim:

1. A dental mirror instrument comprising, in combination, a rectangular mirror insertable in the mouth of a patient, a frame for said mirror, an elongated wiper mounted for movement in said frame on the face of said mirror, said wiper extending across said face between the sides of said frame and being reciprocally movable between the ends of the frame, a handle connected to said frame, and means carried by said handle for moving said wiper on said mirror.

2. A dental mirror instrument comprising, in combination, a rectangular mirror insertable in the mouth of a patient, an elongated wiper mounted for movement on the face of said mirror, said wiper extending across said face from one side to the other and being reciprocally movable between the ends of the face, a handle connected to said mirror for manual manipulation of the instrument by grasping the handle, and an operating member movably mounted within said handle and operatively associated with said wiper for moving said wiper on said mirror.

3. A dental mirror instrument comprising, in combination, a rectangular mirror insertable in the mouth of a patient, a frame for said mirror, an elongated wiper mounted for movement on the face of said mirror, said wiper etxending across said face between the sides of said frame and being reciprocally movable between the ends of the frame, a tubular handle connected to said mirror for manual manipulation of the instrument by grasping the handle, a plunger movably mounted within said handle and operatively coupled to said wiper, means carried by said handle for moving said plunger from an initial position to move said wiper on said mirror, and resilient means carried by said handle for returning said plunger to said initial position when said moving means is inoperative.

4. A dental mirror instrument comprising, in combination, a rectangular mirror insertable in the mouth of a patient, a frame for said mirror, an elongated wiper mounted for movement in said frame on the face of said mirror, said wiper extending across said face between the sides of said frame and being reciprocally movable between the ends of the frame, a tubular handle connected to said frame, for manual manipulation of the instrument by grasping the handle, a plunger reciprocally mounted within said handle, a coupling member connecting said wiper to said plunger for reciprocal movement of the wiper with the plunger, and means carried by said handle for reciprocating said plunger to move said wiper on said mirror.

5. A dental mirror instrument as defined in claim 4, wherein said means for reciprocating said plunger comprises a manually operated push rod.

6. A dental mirror instrument as defined in claim 4, wherein said means for reciprocating said plunger comprises pneumatic piston and cylinder means.

7. A dental mirror instrument as defined in claim 6, wherein said cylinder means comprises a compression bulb.

8. A dental mirror instrument as defined in claim 6, wherein means are provided on said cylinder means for connection to a source of compressed air.

9. A dental mirror instrument comprising, in combination, a rectangular mirror insertable in the mouth of a patient, illuminating means mounted on said mirror along opposite sides thereof, an elongated wiper mounted for movement on the face of said mirror, said wiper extending across said face from one of said sides to the other and being reciprocally movable between the ends of the face, a handle conected to said mirror for manual manipulation of the instrument by grasping the handle, and means within said handle for moving said wiper on said mirror.

10. A dental mirror instrument as defined in claim 9, wherein said illuminating means provides a holder restraining said wiper from lifting off of the face of said mirror.

11. A dental mirror instrument comprising, in combination, a rectangular mirror insertable in the mouth of a patient, orifice means adjacent said mirror along opposite sides thereof for discharging air thereover to vaporize water from the face of the mirror, an elongated wiper mounted for movement on the face of said mirror, said wiper extending across said face from one of said sides to the other and being reciprocally movable between the ends of the face, a handle connected to said mirror for manual manipulation of the instrument by grasping the handle, conduit means within said handle for conveying air to said orifice means, and means within said handle for moving said wiper on said mirror.

12. A dental mirror instrument comprising, in combination, a rectangular mirror insertable in the mouth of a patient, a frame for said mirror, an elongated wiper mounted for movement in said frame on the face of said mirror, said wiper extending across said face from one side of said frame to the other and being reciprocally movable between the ends of the frame, a handle connected to said frame for manual manipulation of the instrument by grasping the handle, means within said handle for moving said wiper on said mirror, an electrical heating element behind the face of said mirror for vaporizing water from said face, and electrical conductors within said handle for energizing said heating element.

13. A dental mirror instrument comprising, in combination, a rectangular mirror insertable in the mouth of a patient, a hollow frame for said mirror, an elongated wiper mounted for movement in said frame on the face of said mirror, said wiper extending across said face from one side of said frame to the other and being reciprocally movable between the ends of the frame, a handle connected to said frame for manual manipulation of the instrument by grasping the handle, means within said handle for moving said wiper on said mirror, orifice means in said frame for discharging air over the face of said mirror to vaporize water therefrom, and conduit means within said handle for conveying air to the interior of said frame.

References Cited in the file of this patent

UNITED STATES PATENTS

| | | |
|---|---|---|
| 577,887 | Stanton | Mar. 2, 1897 |
| 1,764,455 | Kulik | June 17, 1930 |
| 1,897,281 | Spampinato | Feb. 14, 1933 |
| 1,934,110 | Wilson | Nov. 7, 1933 |
| 2,176,620 | Beam | Oct. 17, 1939 |
| 2,680,262 | Jorgensen | June 8, 1954 |
| 2,907,110 | O'Hara | Oct. 6, 1959 |
| 2,948,912 | Wisdom | Aug. 16, 1960 |
| 2,973,541 | Beck | Mar. 7, 1961 |
| 2,984,009 | Codoni | May 16, 1961 |